(12) United States Patent
Klemm et al.

(10) Patent No.: US 7,243,267 B2
(45) Date of Patent: Jul. 10, 2007

(54) AUTOMATIC FAILURE DETECTION AND RECOVERY OF APPLICATIONS

(75) Inventors: Reinhard P. Klemm, North Plainfield, NJ (US); Navjot Singh, Denville, NJ (US)

(73) Assignee: Avaya Technology LLC, Basking Ridge, NJ (US)

( * ) Notice: Subject to any disclaimer, the term of this patent is extended or adjusted under 35 U.S.C. 154(b) by 695 days.

(21) Appl. No.: 10/090,041

(22) Filed: Mar. 1, 2002

(65) Prior Publication Data

US 2003/0167421 A1    Sep. 4, 2003

(51) Int. Cl.
*G06F 11/00*   (2006.01)
(52) U.S. Cl. ............... 714/38; 714/4; 714/10; 714/15; 714/39
(58) Field of Classification Search ............ 714/4, 714/10, 15, 38, 39
See application file for complete search history.

(56) References Cited

U.S. PATENT DOCUMENTS

| | | | |
|---|---|---|---|
| 6,282,701 B1 * | 8/2001 | Wygodny et al. | 714/38 |
| 6,701,454 B1 * | 3/2004 | Fischer et al. | 714/38 |
| 6,745,350 B1 * | 6/2004 | Cline et al. | 714/38 |
| 6,757,897 B1 * | 6/2004 | Shi et al. | 718/102 |

OTHER PUBLICATIONS

Klemm et al, Enhancing JAVA Server Availability with JAS, *Softw. Pract. Exper.* 2001:31:697-716 16, Mar. 2001.

Wang et al, Checkpointing and Its Applications, *Proc. IEEE Fault-Tolerant Computing Symp.* (FTCS-25), pp. 22-31, Jun. 1995.

Marzullo et al, Tools for Constructing Distributed Reactive Systems, *DARPA, NASA Ames grant No. NAG-593*, Contract N00140-87-C-8904, Feb. 22, 1991.

Plattner, Real-Time Execution Monitoring, *IEEE Transactions on Software Engineering*, vol. SE-10, No. 6, pp. 756-764, Nov. 1984.

Huang et al, NT-Swift: Software Implemented Fault Tolerance in Windows NT, *Proceedings of the 2nd USENIX Windows NT Symposium*, Seattle, WA, Aug. 3-4, 1998.

Dimaio et al, Execution Monitoring and Debugging Tool for ADA Using Relational Algebra, *Proceedings of the ADA International Conference in Use* ():109-123 1985.

(Continued)

*Primary Examiner*—Robert Beausoliel
*Assistant Examiner*—Joseph Manoskey
(74) *Attorney, Agent, or Firm*—Cohen Pontani, Lieberman & Pavane LLP (57) ABSTRACT

A method and apparatus for executing target application programs with employment of a supervisor that is coupled to the executing target application through a conventional status reporting port of the computer. Events that represent execution errors or unexpected behavior are provided to the reporting port, or discovered through the reporting port, and the supervisor responds to such events by perusing a configuration that is tailored to the executing target application. For each reported event, the supervisor retrieves one or more actions that the configuration file specifies for the reported events and executes the specified actions. The configuration file includes actions that aim to effect a recovery, from reported events, including restart application, or a thread of the application, based on checkpointed data, restart target application as soon as it becomes idle, and suspend a thread when a thread starvation condition exists.

40 Claims, 5 Drawing Sheets

OTHER PUBLICATIONS

Atkinson et al, A Review of the Rationale and Architectures of PJama: a Durable, Flexible, Evolvable and Scalable Orthogonally Persistent Programming Platform, Sun Microsystems Laboratories, M/S MTV29-112, Jun. 2000.

Cristian, F., "Exception Handling and Tolerance of Software Faults", *Software Fault Tolerance*, Chapter 4, Edited By Lyu, 1995, John Wiley & Sons, Ltd.

Nicola, Victor E., "Checkpointing and the Modeling of Program Execution Time", Software Fault Tolerance, Chapter 7, 1995.

Huang, Y., et al., "Software Fault Tolerance in the Application Layer", Software Fault Tolerance in th Application Layer, Chapter 10, 1995.

Jane-Ferng Chiu and Ge-Ming Chiu Process-Replication Technique for Fault-Tolerance and Performance Improvement in Distributed Computing Systems, in Proceedings of the Third International Symposium on High Performance Distributed Computing, 1994.

Ganesha Beedubail et al., An Architecture for Object Replication in Distributed Systems, Department of Computer Science, Texas A&M University, College Station, TX 77843, Technical Report (TR-96-006), Mar. 1996.

Huw Evans "Why Object Serialization is Inappropriate for Providing Persistence in Java." Department of Computer Science, The University of Glasgow, 2000.

Malcolm Atkinson "Persistence and Java A Balancing Act." Lecture Notes in Computer Science, vol. 1944, 2001, pp. 1 ff., Springer Verlag.

James S. Plank "An Overview of Checkpointing in Uniprocessor and Distributed Systems, Focusing on Implementation and Performance," Department of Computer Science, University of Tennessee, Report No. UT-CS-97-372, Jul. 1997.

* cited by examiner

AUTOMATIC FAILURE DETECTION AND RECOVERY OF APPLICATIONS

BACKGROUND

This invention relates to fault recovery in software systems.

A stored program controlled computer system comprises a basic processor with an operating system (OS) that provides a first-level user interface. Examples of operating systems are UNIX (a trademark of UNIX System Laboratories) and WINDOWS (a trademark of Microsoft). Programming languages such as C and C++ and their runtime environments provide a second-level user interface to facilitate programming on a computer system. Sometimes, even higher-level languages such as Java (a trademark of Sun Microsystems) and their runtime environments form a third-level user interface to further ease application programming. Each higher lever user interface attempts to reduce the expertise required of the computer system's programmer while (typically) reducing the programmer's control over the computer system.

Increasingly, server systems—which are computer systems that serve a plurality of clients—are partially or completely implemented in the Java programming language.

Most such servers have stringent availability requirements, which translate to a need for very reliable software. One reason for Java's popularity in server embodiments is the perception that Java's features help writing reliable code quickly. A variety of mechanisms are available in Java that help avoid many programming errors that are common in other languages. This includes, for example, pointerless programming, automatic garbage collection, type safety, the integration of threads as objects, and an extensive library of convenience classes. Other mechanisms, such as Java's exception handling, encourage writing code that recovers from errors, thereby adding to the reliability of the resulting program.

Even a very reliable server, however, is likely to encounter an execution error at some point in time. The behavior of a server in response to an error is another factor that strongly influences its availability, and here, too, Java has certain advantages. For example, if an error occurs in a Java program that is not caused by a virtual machine fault and which violates the semantics of the Java language, then the Java Virtual Machine (JVM) raises an exception and either invokes the appropriate user-supplied exception handler or, in the absence of such an exception handier, terminates the failed thread (a thread is a concurrent unit of execution inside a process, numerous threads can execute in a particular process, and numerous processes can be part of an application, and a thread can depend on another thread). This type of controlled reaction to an error often isolates the error to the failed thread. This stands in contrast to a language such as C and C++, where errors can spread without immediate detection and containment, and are often caught only by the operating system, which can result in the complete failure of the parent application.

To illustrate this point, consider a server implemented in C or C++ with no additional fault tolerance provisions. Suppose this server had a dedicated client handler thread for each current client and that one of the client handler threads modifies an array element beyond the allocated range of the array. There are several possible outcomes of this error. One is the corruption of data in the server that may lead to serious failures later on. Another possible outcome is the access of a memory location outside the address space of the server process. The operating system will detect this memory access attempt and shut down the entire server application (fail-stop behavior), potentially resulting in the loss of work that the server had performed on behalf of other clients that depended on the application that is shut down, and the temporary loss of availability of the application for all of the server's clients.

On the other hand, when the server is implemented in Java and one of its client handler threads attempts to modify an array element that is beyond the allocated range of the array, the Java virtual machine will immediately detect the error and raise an ArrayIndexOutOfBoundsException. There is a good chance that the server does not include a programmer-supplied exception handler for this exception, and, in such a case, the JVM terminates the offending client handler thread. Thus, the JVM contains the failure in the offending thread, and all of the other client handler threads are unaffected, continuing to be available to their clients. In other words, the failed thread is terminated but neither the parent application, nor the other clients of that application are affected.

Although this Java failure behavior, which can be called graceful degradation, is superior to the C/C++ failure behavior with respect to server availability, it is not ideal. Graceful degradation does not restore the availability of a server. It merely limits the damage done by a failure. If the failed thread is pivotal, in the sense that the proper functioning of a server depends on it, graceful degradation will not enable the server to continue providing its intended service. Even if the failed thread is non-pivotal, graceful degradation will prevent immediate disastrous results, but the availability of the server will degrade, and may gradually worsen to a point where the server will cease to function. This type of failure can be particularly insidious because graceful degradation, unlike fail-stop behavior, allows the server to operate with reduced availability, which can be difficult to detect by the users and administrators of the server.

There is also a wide range of failures that the Java runtime environment (JRE), i.e., the combination of JVM and Java runtime library, does not detect at all. This includes failures such as thread starvation, thread deadlock, excessive garbage collector activity, machine or process crash, thread hangs, etc. The reason is that, basically, all that the JRE does is log a stack trace of a failed thread. While this is certainly helpful, it is often insufficient for debugging purposes.

The art has attempted to assist programmers with failure analysis and recovery tools. One such tool is described by Huang et al in "NT-SwiFT: Software Implemented Fault Tolerance on Windows NT," *Proceedings of the 2nd USENIX Windows NT Symposium*, pp. 47–55, Seattle, Wash., USA, August 1998. This tool can detect the crash of a watched target application and restart a crashed application. However, it can only catch failures with a fail-stop behavior, and such failures are relatively rare in Java programs because of Java's graceful degradation behavior. They occur only due to a fault in the Java virtual machine, due to a fault in a native code attachment to a Java application, or due to external influences such as a machine crash or a forceful shutdown of the target application through an operating system command, e.g., a kill signal.

Bernhard Plattner in "Real-Time Execution Monitoring," *IEEE Transactions on Software Engineering*, SE-10(6), pp. 750–764, November 1984, describes a supervisor for real-time applications called a real-time monitor. However, the functionality of, and the real-time constraints for, this real-time monitor require special hardware support and the need for two machines, as well as access to the source code of the target application.

An application supervisor for the ADA programming language is described by DiMaio et al in "Execution Monitoring and Debugging Tool for ADA Using Relational Algebra," *Proceedings of the ADA International Conference on ADA in Use*, pp. 109–123, 1985. Like the real-time monitor, the ADA supervisor lets the user specify failure detection and recovery policies. However, the ADA supervisor requires source code editing of the target program and subsequent recompilation.

The Meta system described by Marzuilo et al in "Tools for Distributed Application Management," *IEEE Computer*, 24(8) pp. 42–51, August 1991, is a toolkit for writing external application supervisors for distributed target applications, written in C and running, for example, on UNIX. Meta allows the placement of powerful generic and customized sensors (probes placed in the target application that can be queried to deliver information about the program or the program state) and actuators (code fragments that affect program execution). While Meta allows the coordinated supervision of all remote components of a distributed application, it requires detailed knowledge of, changes and additions to, and recompilation of the target source code.

SUMMARY

Deficiencies are ameliorated and an improvement is achieved in the art with a generic collection of software components, collectively termed the Java Application Supervisor (JAS), which is executed in the JRE that runs the monitored target application and provides significant capabilities thereto. JAS is an external supervisor (in contrast to an internal supervisor of a target application that is integral to the target application) that may be used for any Java application without having to modify the target application, providing automatic (i.e., without human intervention) failure detection, recording, and recovery that encompasses more than just fail-stop action.

JAS receives process event notifications from the JRE and determines whether an execution problem, or failure, has occurred. In response to such an event, JAS executes specified actions that attempt to recover from detected failures and to thereby restore the availability of the target application quickly and automatically. JAS also provides a detailed record of preselected parts of the target application state at the time of a failure, in order to assist in a subsequent manual failure analysis. Illustrative of JAS's capabilities are a thread restart action in response to both normal and abnormal termination, application restart-when-idle capability, detection and elimination of thread starvation conditions, partial state dumps in response to event notifications, and checkpointing.

Simple user-specified policies guide the process of mapping events that occur during the target execution to recovery actions. The complete separation between such policies and the target application logic allows for the application logic to be maintained independently from the reliability-related logic represented by the JAS policies.

Because JAS is an extension of the standard JRE, there is no need for modifications to or recompilation of the target application and for installing a specialized JRE. Therefore, JAS is very easy to install and use and works for third-party software (target applications) and legacy systems. Only the above-mentioned checkpointing requires some modifications of the target applications (manually or programmatically), but these modifications are extremely simple.

Although JAS is not intended to replace customized failure detection and recovery mechanisms in safety-critical applications, it can serve as an additional safety net for a customized application supervisor. For non-safety-critical applications, JAS can replace a customized application supervisor. Applications with high availability requirements, such as in servers, benefit most from JAS.

DETAILED DESCRIPTION

A description of an earlier version of the system disclosed herein is found in Klemm et al "Enhancing Java Server Reliability with JAS," *Software Practice & Experience*, vol. 31, pp. 697–716, 2001. This description is hereby incorporated by reference in its entirety.

Figure 1:
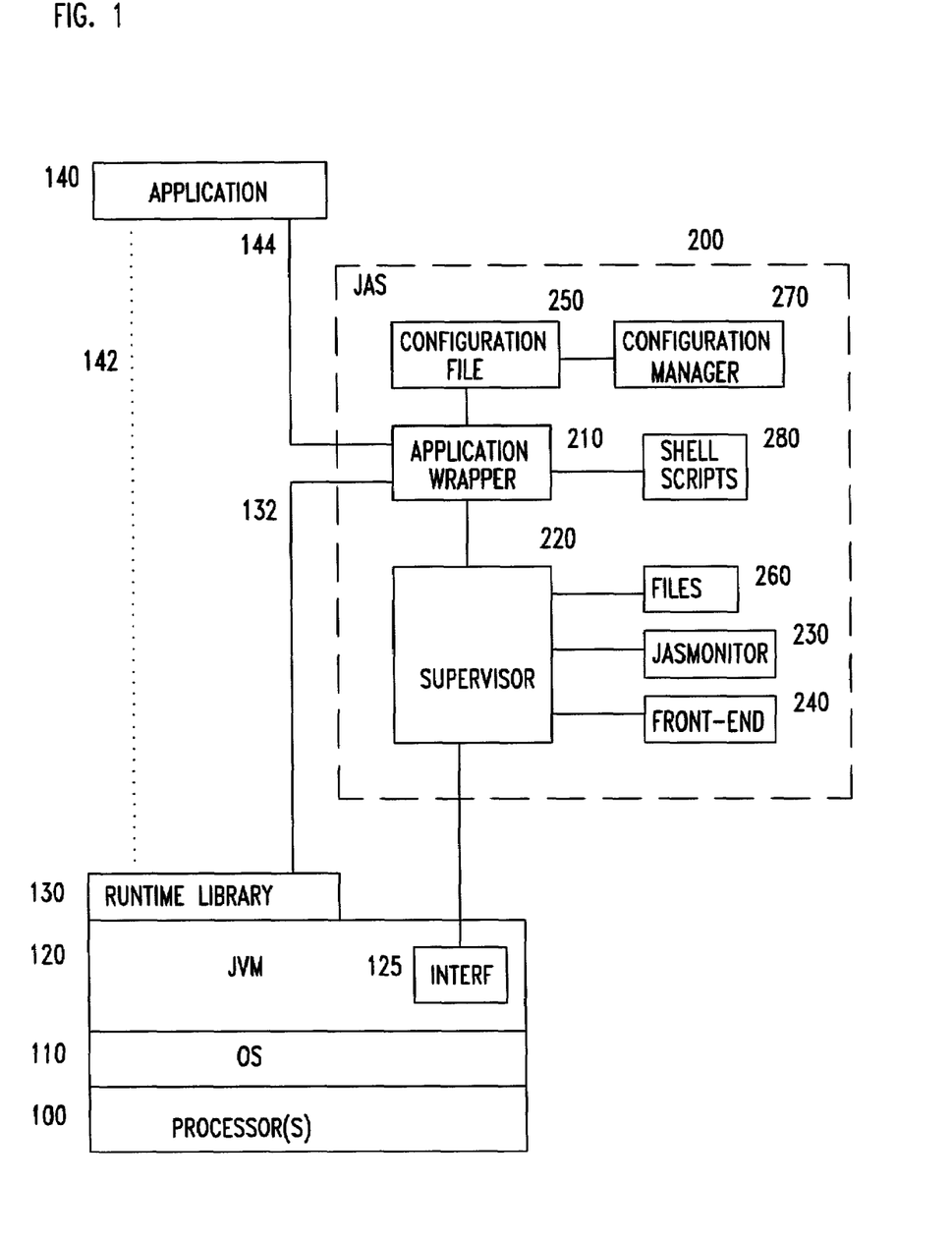
FIG. 1 presents a block diagram of an embodiment where the monitoring and recovery concepts disclosed herein are illustrated in a Java Application Supervisor that operates in a Java runtime environment.

FIG. 1 presents a diagram of a monitoring and recovery system that, illustratively, works in a Java runtime environment, serving as a vehicle for disclosing the principles of this invention. It should be understood that use of Java is merely illustrative, and that any system that provides an interface not unlike the interfaces that JRE provides can benefit from the principles disclosed herein. The prior art Java environment portion is represented in FIG. 1 by elements labeled 1xx, and the monitoring and recovery system, which is termed Java Application Supervisor herein, or JAS, is represented in FIG. 1 by element labeled 2xx.

Element 100 in FIG. 1 is the set of one or more processors of the FIG. 1 server, and element 110 is the operating system that "sits on top of" the server processor(s) (that is, it interfaces directly with the server's one or more processors). The operating system is dependent on the hardware architecture of element 100, and it provides an established interface. Element 120 is the Java Virtual Machine, which is a set of programs that interact with the operation system. The JVM is dependent in its design on the operating system, and it provides an established Java programming interface to users. For purposes of this disclosure it is assumed that the JVM is error free. JVM 120 includes an interface 125 that includes the Java Virtual Machine Profiler Interface (JVMPI), the Java Virtual Machine Debug Interface (JVMDI), and the Java Native Interface (JNI). (Details on these interfaces, can be obtained from Sun Microsystems Inc. Java Virtual Machine Profiler Interface. Java Virtual Machine Debug Interface. Java Native Interface. http://www.javasoft.com). This (combined) interface 125 also provides an established interface to Java users.

In conventional operations, a target application, such as application 140, is coupled directly to the JVM in close association with runtime library 130, as shown by dotted line 142 in FIG. 1. In accord with the principles disclosed herein, however, application wrapper 210 of JAS 200 is interposed between the target application and runtime library 130, as shown by lines 144 and 132.

In addition to application wrapper 210, the JAS portion of the FIG. 1 arrangement includes a supervisor agent 220, a configuration file 250, a configuration manager 270 that controls the contents of configuration file 250, shell scripts 280, a front-end module 240 that communicates with supervisor agent 220 via TCP/IP protocol, daemon process JAS-Monitor 230, and stored files 260. The JAS modules 210, 220, 230, 280 are software entities that reside in the memory of element 100, and the processes of these modules are executed by JVM 120 (i.e., are written in the Java language) or by OS 110 directly (i.e., written in C or C++, or whatever other language that is compatible with OS 110). JAS modules 240, 270 may or may not reside in the memory of element 100. The aforementioned JAS modules communicate with each other as appropriate, and some of these communication paths are shown in FIG. 1. It may be noted that runtime library 130 includes a set of Java runtime class implementations that are modified to cooperate with the JAS modules, as described below.

As may be observed from the FIG. 1 architecture, JAS can be strictly an external supervisor for Java applications, meaning that no source code or bytecode changes in the target are necessary for JAS to operate (unless the user wishes to introduce a checkpointing feature, that is described more fully below). Its operation is transparent to target applications, but a number of requirements are imposed on target applications that can be monitored by JAS by nature of the design of each JAS embodiment. For example, the illustrative implementation disclosed herein can supervise any Java application that fulfills the following conditions:

1. The application's functionality does not depend on the total number of threads in its address space (because JAS adds two threads to the target application).
2. The application makes no assumptions about the order in which threads are scheduled, or about absolute thread execution times.
3. The application does not negate changes to a number of classes, described below, that are modified for proper operation of JAS.
4. The application is executed on JVM 100.

Having met these conditions, JAS can detect the following target application and JVM events that potentially impact the availability of the target application:

process crash due to a fault in the virtual machine or application native code
process termination due to an external force such as a machine shutdown or kill signal to the process;
process hang (process execution time exceeds user-specified threshold);
thread failure due to an uncaught exception;
thread termination without an exception (if a thread is supposed to run forever, its termination would indicate a problem);
thread starvation (one or more threads in the application rarely or never obtain the CPU because other threads dominate the CPU);
thread hang (thread execution time exceeds user-specified threshold);
illegal or excessive number of threads relative to a user-specified threshold;
application exits with an error code (call to System.exit(n) where n is different from a user-specified number that indicates a normal application completion)
excessive garbage collector activity, where the activity is deemed excessive when it exceeds user-specified thresholds for duration and frequency;
raised and caught exception.

JAS detects many of the events above as soon as they occur (process crash, process termination, thread failure, raised and caught exception, thread termination without an exception, illegal or excessive number of threads, application exits with an error code, excessive garbage collector activity). As for the other events (process hang, thread starvation, thread hang) JAS checks for these events periodically, if specified to do so, in time intervals specified by configuration file 250.

It is worth noting that JAS typically does not prevent execution problems or failures. Rather, it attempts to recover from them once they have occurred with one of the actions in the following list:

ignore event;
notify JAS front-end and log failure;
dump partial target state;
suspend/resume threads;
restart thread;
restart idle application (i.e., restart application when it become idle);
restart application immediately;
terminate application;
checkpointing; and
terminate thread.

Of course, other actions can be designed into a JAS implementation, and one can also specify combinations of actions.

Front-end 240 is a graphical user interface that visualizes and logs notifications of events that JAS has detected, and of actions that JAS has taken in response to detected problems and failures. Front-end 240 resides in a separate process and can be executed on a remote machine; hence the communication with front-end 240 was chosen in the disclosed illustrative embodiment to be carried out in accord with the TCP/IP protocol.

To provide automatic failure detection and recovery for a given target application, JAS needs to be configured for that application. In the first instance, it is the function of configuration manager 270 to create a configuration file for each application that may execute on the FIG. 1 system. That is, when an application is installed, configuration manager creates a configuration file for the application, based on a default configuration file that a particular embodiment of the FIG. 1 system offers. More specifically, configuration manager 270 peruses the application's bytecode and, based on the predetermined criteria, modifies the created default configuration file to create a "custom" configuration file for the application. The created configuration file 250 contains a set of policies, subdivided into thread and system policies, and system-wide JAS parameters. Each policy in the configuration file describes the recovery action(s) to be taken if and when a specified event occurs and, accordingly, a policy comprises an event type and usually two actions. The first action is triggered by an event of that type as long as the total number of events of that type does not exceed a specified threshold within a certain time window (probation). The second action is triggered if the total number of events of that type reaches (or exceeds) the threshold for the number of events of that type during the probation. The maximum and the probation specifications are part of the policy.

To illustrate, in response to a specific target application, configuration manager 270 might discover that the target application employs classes Fetch Thread, Prefetch Thread, Watchdog, and WebCompanion. Consequently, manager 270 might create a default configuration file 250 such as the following—where events are shown in bold font, values (such as maximum values, probation, etc.) are shown in "Book Antiqua" font, and actions are shown in italic font:
FetchThread

```
abnormalThreadDeath INFINITE INFINITE none none
naturalThreadDeath INFINITE INFINITE none none
expectedCompletionTime INFINITE INFINITE INFINITE none none
softLimit INFINITE INFINITE INFINITE none none
hardLimit INFINITE INFINITE INFINITE none none
    PrefetchThread
abnormalThreadDeath INFINITE INFINITE none none
naturalThreadDeath INFINITE INFINITE none none
expectedCompletionTime INFINITE INFINITE INFINITE none none
softLimit INFINITE INFINITE INFINITE none none
hardLimit INFINITE INFINITE INFINITE none none
    Watchdog
abnormalThreadDeath INFINITE INFINITE none none
naturalThreadDeath INFINITE INFINITE none none
expectedCompletionTime INFINITE INFINITE INFINITE none none
softLimit INFINITE INFINITE INFINITE none none
hardLimit INFINITE INFINITE INFINITE none none
    WebCompanion
abnormalThreadDeath INFINITE INFINITE none none
naturalThreadDeath INFINITE INFINITE none none
expectedCompletionTime INFINITE INFINITE INFINITE none none
softLimit INFINITE INFINITE INFINITE none none
hardLimit INFINITE INFINITE INFINITE none none
    System
maxRestarts 0
systemExit 0 quit dontDumpState
VMShutdown quit dontDumpState
supervisorInternalError none
expectedCompletionTime INFINITE none
softLimit INFINITE INFINITE INFINITE none none
hardLimit INFINITE INFINITE INFINITE none none
GCmaxTime INFINITE INFINITE INFINITE none none
GCmaxFrequency 1 INFINITE INFINITE none none
checkInterval INFINITE
monitorAllExceptions no
threadStarvationDetection off
catchThrowableAllocations {}
eventHandlerClassName none
JASMonitor no
Frontend no
```

It is noted that each thread class in the above illustrative configuration file has five specified policies. These policies determine what events originating at a thread of the specified class JAS ought to consider a problem or failure, and how to respond to them. To generally characterize these five policies, they concern:

thread failure due to an uncaught exception;
thread termination without an exception;
thread hang;
soft limit for number of threads has been exceeded;
hard limit for number of threads has been exceeded.

The configuration file is in a human-readable form, by which it is meant that the file is a "flat" file, written in something akin to a recognized human language, such as English. This facilitates modification of the created configuration file by the person who installs the target application; that is, the person may add to the set of policies of the configuration file, or merely specify values (e.g. maximum values, probation values) and desired responsive actions. It is noted that each class may be an inner class or a class that will be loaded during target application's execution.

The soft limit and the hard limit are two different threshold values for the number of threads of the given class, where the hard limit is at least as large as the soft limit. The user may want different policies to apply when different threshold values for the number of threads have been reached. For simplicity, only two different threshold values can be specified. When the lower of the two threshold values (soft limit) has been reached, a less severe action is typically required of JAS than when the higher of the two threshold values (hard limit) has been reached. Exceeding a soft or hard limit on numerous threads could result in resource, performance, or functional problems that might decrease availability of the target application. It could also mean that there is a bug in the program that causes more than an allowed number of threads of a given class to be spawned.

An illustrative action that is employed in connection with the limits policies is the suspend/resume threads action. It is used, for example, in response to an excessive number of threads, or a thread starvation situation (discussed below). In the case of an excessive number of threads, each newly spawned thread that brings the total number of threads to a user-specified threshold is suspended immediately until the total number of active threads has fallen below the threshold. At such time, JAS resumes the execution of the oldest previously suspended thread. The reason for the suspension is that an excessive number of concurrent threads can seriously endanger the availability of a target application, because of a potential for performance problems as well as for situations that the target application is not functionally prepared to handle. Thus, the suspend/resume threads action can actually prevent certain execution problems and failures, unlike other JAS actions. It may be noted that the suspend/resume thread action also offers an administrator of JAS a way to shut down and restart the server in a controlled way because limiting the number of concurrently executing threads can enhance the responsiveness of the target application to administrator interventions.

Figure 2:
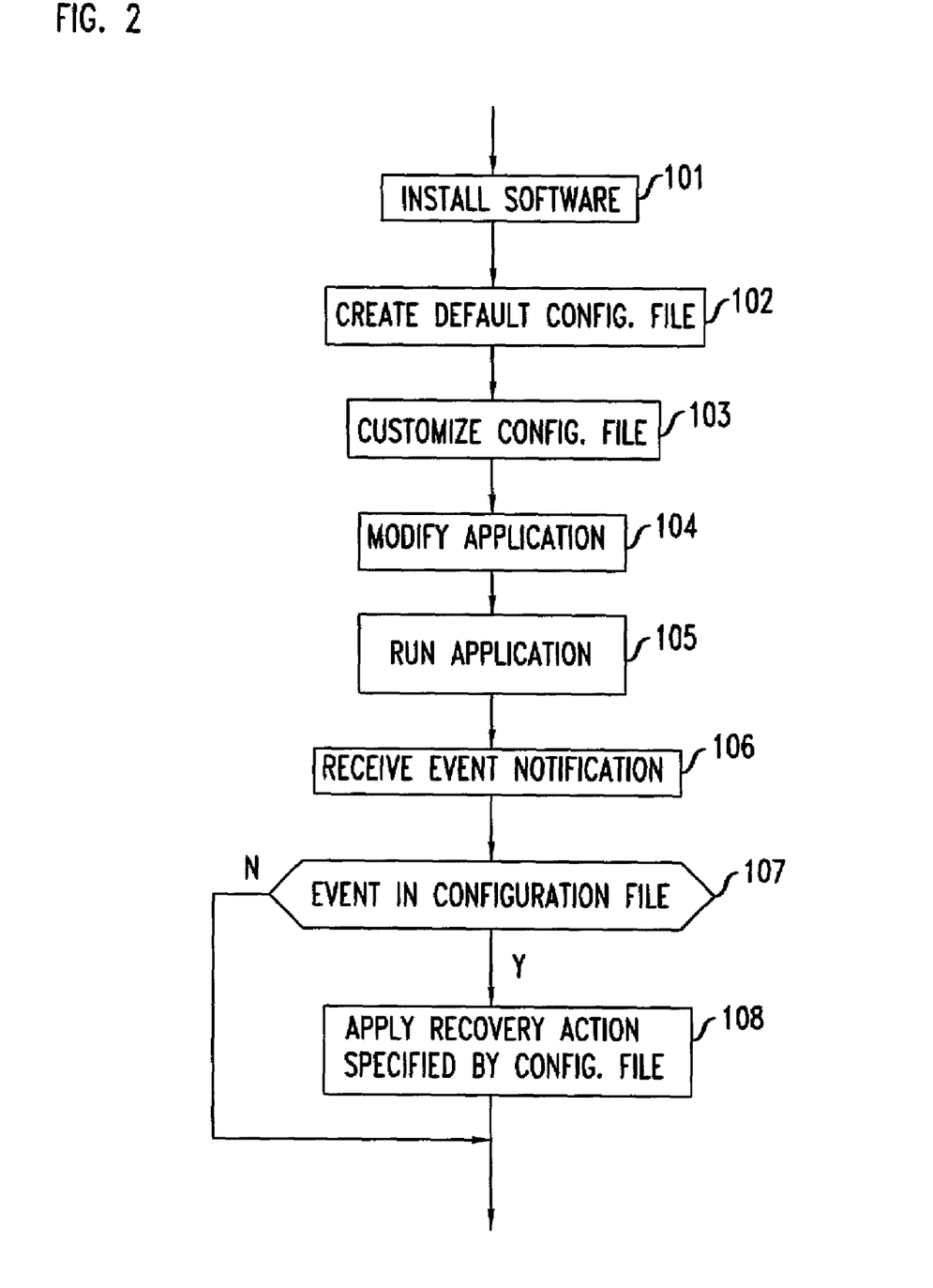
FIG. 2 presents a general block diagram of JAS operations.

A general flow diagram of the operational process of JAS is depicted in FIG. 2. In step 101, the target application is presented, and in step 102 configuration manager 270 creates a configuration file that is partially customized to the target application. In step 103 the user modifies the configuration file, as described above, and in step 104, the user modifies the application when a certain type of checkpointing is desired (described more fully below). Following step 104, step 105 runs the target application.

To request that the target application begin to run, the user triggers shell script 280, which directs the JVM to load modified API classes, followed by a loading of standard classes. Script 280 then directs JVM to load JAS shared library and the application wrapper, and hands the name of the target application to wrapper 210. Application wrapper 210 parses configuration file 250 of the target application, for every class that is mentioned in the configuration file and that is loadable at this point, loads the class object and assigns a unique ID to it, for every class that is mentioned in the configuration file but which is not loadable at this point, stores a unique ID for it, creates the target application through Java reflection, and starts the target's main( ) method. The application wrapper also starts a periodic thread check process.

While the target application is running, it is possible that some events will occur that the will JVM report to supervisor 220. Step 106 captures event notifications and passes control to step 107. Step 107 ascertains whether a reported event is contained in the configuration file. If so, control passes to step 108, which takes recovery actions as specified by the configuration file. Otherwise, step 108 is bypassed. Of course, it should be realized that multiple event reports, and consequent actions, can occur during one execution of the target application.

A segment of a user-modified configuration file 250 is presented below, with a single class, T.

T

```
abnormalThreadDeath 2 3600000 notify dumpState restartIdleApp dumpState
naturalThreadDeath 0 INFINITE none quit dontDumpState
expectedCompletionTime INFINITE INFINITE INFINITE none none
softLimit 100 INFINITE 300000 none restartIdleApp dontDumpState
hardLimit 200 INFINITE 300000 none restartIdleApp dontDumpState
      System
systemExit 0 restartApp dontDumpstate
VMShutdown quit
supervisorInternalError quit dontDumpState
expectedCompletionTime INFINITE none
softLimit INFINITE INFINITE INFINITE none none
hardLimit INFINITE INFINITE INFINITE none none
GCmaxTime 500 5 60000 notify dontDumpState restartIdleApp dumpState
GCmaxFrequency 150 10 60000 notify dontDumpState restartApp dumpState
catchThrowableAllocations {
      java.lang.ArrayIndexOutOfBoundsException INFINITE 60000 restartApp
         dumpState restartApp dumpState
      java.lang.OutOfMemory Error 3 INFINITE notify dumpState
         restartIdleApp DumpState }
      System-Wide Parameters
maxRestarts 3
checkInterval 3000
monitorAllExceptions yes
threadStarvationDectection 3000 medSensitivity suspend dumpState
JASMonitor 5000
```

An action that is typically found numerous times in a configuration file, such as the one presented above, is the dumpState action, or its complement dontDumpState. In accord with the principles disclosed herein, this is a partial target application state dump that facilitates subsequent problem, or failure, analysis. When this action is specified, JAS logs in a file all stack traces, including the names of the methods on the stacks as well as the names and values of the local variables of those methods. The intent is for the file to contain information pertaining to each thread that was in the target application at the time of the failure.

The restart application and restart idle application actions are permissible in response to any event. The restart application action shuts down the target immediately and then restarts it, up to a user-specified maximum number of times. The restart idle application action terminates and restarts the application when no thread in the target has consumed CPU time for a certain user-defined minimum time span. This action allows a server restart with less impact on clients than an immediate restart. Waiting with a restart until the target is idle, however, is appropriate only if a detected problem is not severe enough to require immediate handling and if all threads move to an idle state within an acceptable time after the problem occurrence. A server restart is a drastic but typically very effective way of restoring server availability.

Figure 3:
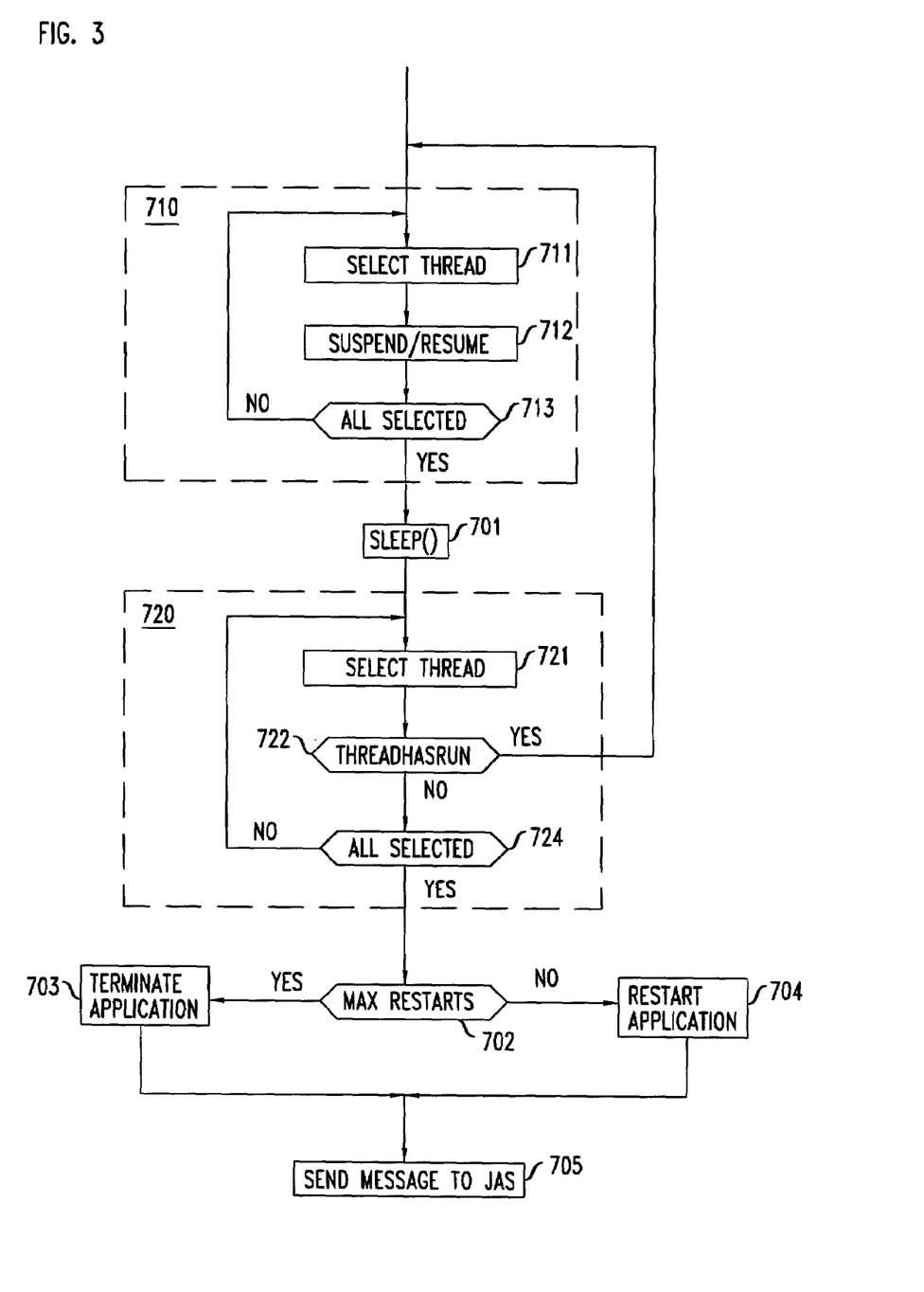
FIG. 3 shows a flowchart of a process for restarting a target application as soon as it becomes idle.

FIG. 3 presents a flowchart of the process for restarting an application when it becomes idle. The primary task, of course, is to determine when the application becomes idle. This is accomplished by checking whether any of the threads consume CPU time by running the ThreadHasRun method. However, since JVMPI requires a call to the SuspendThread method before a call to the ThreadHasRun method, each thread is suspended and immediately resumed, and then the ThreadHasRun method is executed. Thus, in FIG. 5 subprocess 710 is carried out, followed by step 701 that calls a sleep( )function, and subprocess 720. In subprocess 710, a thread is selected in step 711, and in step 712 it is suspended and immediately resumed. Control then passes to step 713, which ascertains whether all of the threads have been so suspended and resumed. If not, control returns control to step 711 to select another thread. Once all of the threads have gone through the suspend-and-resume step, control passes to step 701, which is a call to sleep( ) for a preselected time interval, and this time interval gives the threads an opportunity to run, if they are not idle, and passes control to subprocess 720. Subprocess 720 ascertains whether any of the threads did run. Accordingly, step 721 selects a thread, and step 722 executes ThreadHasRun. Based on the return value of ThreadHasRun, a determination is made whether any CPU was consumed since the last suspense/resume, and if so, the conclusion is reached that the application is not idle, and control returns to subprocess 710. Otherwise, control passes to step 724, which determines whether all threads have been selected. If not, control returns to step 721 to select another thread. Otherwise, the conclusion is reached that the application is idle.

At this point, when a determination is reached that the target application is idle, control passes to step 702, which determines whether it is permissible to restart the target application. A target application may not be restarted if the number of previous restarts has reached the maximum allowable restarts, as specified in configuration file 250. When the maximum number of restarts has been reached, control passes from step 702 to step 703, where the target application is terminated, and then to step 705, which reports to the JAS front-end. Otherwise, control passes to step 704, where the application is restarted, and a variable corresponding to the number of restarts is incremented. Control then passes to step 705. Of course, the test relative to the maximum number of restarts can be executed before subprocess 710.

The restart thread action is permissible in response to a thread failure or termination. It restarts the run method of a thread class with all the object-level variables of the thread object intact. Depending on the application, a thread restart could corrupt the internal state of the target or could otherwise result in unexpected system behavior. Therefore, this action has to be used with caution or the thread class has to be programmed with the possibility of a thread restart in mind. The thread restart action typically works well for threads that have little or no interaction with other threads. In these cases, a thread restart can restore the target availability almost immediately. Client request handlers are a good example of such threads.

Figure 4:
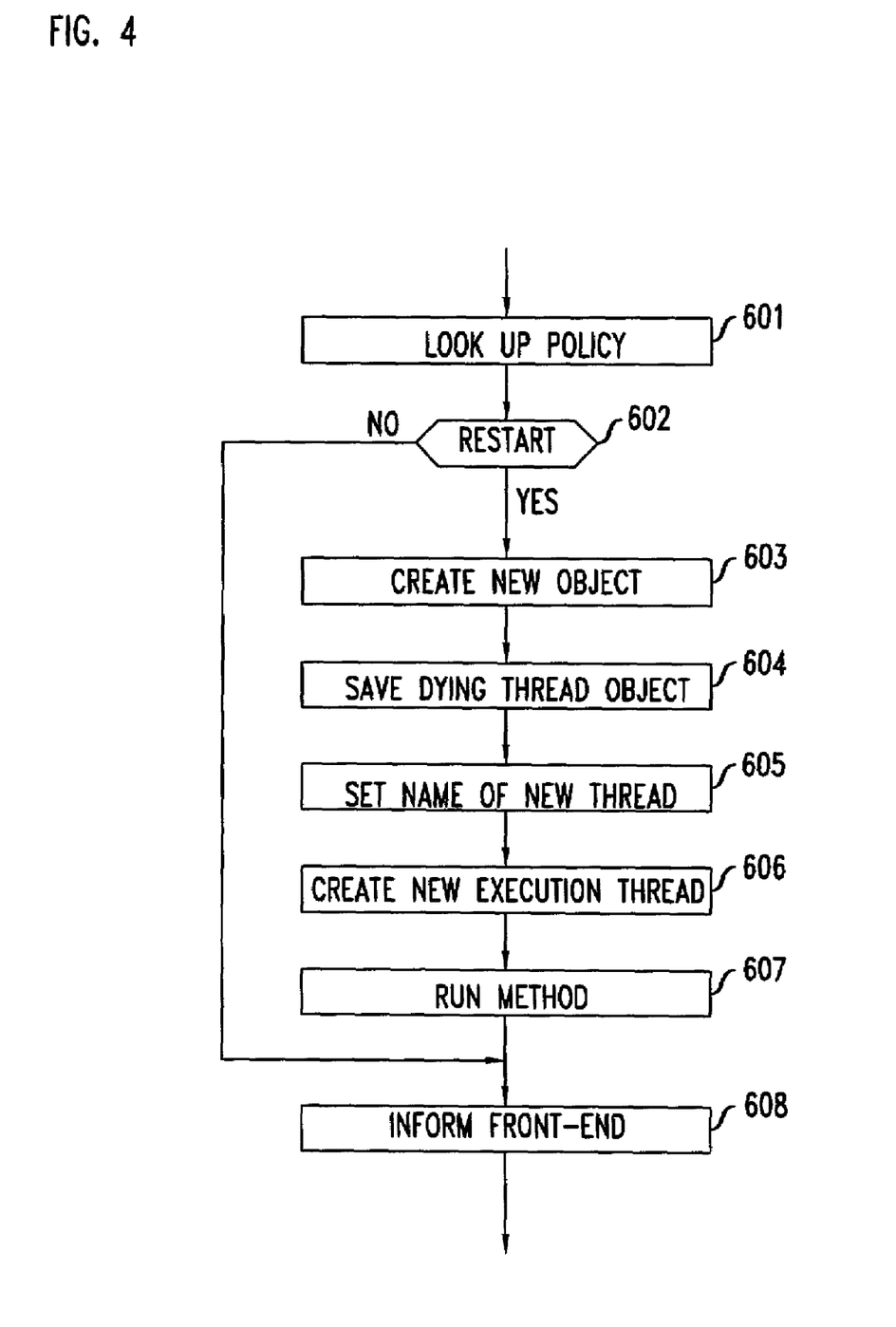
FIG. 4 shows a flowchart of a process for restarting a thread.

FIG. 4 presents a flowchart of the thread restart action following a normal termination of the thread. When a thread is being terminated, JVM calls the ThreadGroup.remove method and this method informs JAS of this fact (it may be remembered that this method was modified to do just that). At step 601, JAS determines the class ID of the dying thread by looking up the thread entry created during thread start, and uses the class ID to then look up the thread policy for this thread. The thread policy, as retrieved from the configuration file, is stored internally in the supervisor agent for faster access. Control then passes to step 602, which determines whether the policy mandates a thread restart. If not, control passes to step 608, which simply informs the front-end that the thread died.

When step 602 determines that a thread restart is mandated, control passes to step 603, with the ThreadGroup.remove method creating a new object of class StarterThread. Then, step 604 saves the dying thread object in a class variable of StarterThread, and step 605 sets the name of StarterThread to that of the dying thread. Thereafter, control passes to step 606 where ThreadGroup.remove calls StarterThread.start, which creates a new execution thread, and passes control to step 607. In step 607, StarterThread.run calls the run method of the dying thread, thus restarting the dying thread with the class variables intact. Lastly, control passes to step 608, which sends a message to the JAS front-end, reporting on the action taken. It may be noted, in connection with step 605, that the name of a thread includes the class ID of the thread class, although the class ID is hidden from the target application when the latter wants to determine the name of the thread. Thus, setting the name of the StarterThread to that of the dying thread copies the class ID of the dying thread into the StarterThread and makes all class policies of the dying thread apply to the StarterThread from that point on.

Thread restart after abnormal termination is very similar to that of thread restart after normal termination. The only difference lies in the fact that the trigger method is ThreadGroup.uncaughtException, rather than ThreadGroup.remove (prior to step 601, in step 603 and step 606).

For further clarification of the configuration file entries, the following reviews the first two configuration file entries in detail, followed by a discussion of some of the other entries.

The first line in the above configuration file segment is:
abnormalThreadDeath 2 3600000 notify dumpState restartIdleApp dumpState and it means that if not more than 2 threads of the given class terminate abnormally within any time window of 3600000 milliseconds, then front-end module 240 is to be notified, and a partial dump of the target application's state is to be written to a file of element 260. If more than 2 threads of the given class terminate abnormally within this time window, then a partial dump of the target application's state is to be written to a file and the entire application is to be restarted once all threads are idle.

The second line in the above configuration file segment is naturalThreadDeath 0 INFINITE none quit dontDumpState and it means that if any thread of the given class terminates normally from the virtual machine point of view, the application is to quit immediately. This choice of action implies that the thread terminated by action of a program bug or by normal end of execution of the target application. In either case, it is desired to shut down the application. The dontDumpState action modifier directs JAS to not write a partial record of the target state to file when this event occurs. It may be noted that the naturalThreadDeath policy is likely to be instituted for threads that are designed to terminate only in case of a bug or when the application is shut down deliberately from the outside (user action, kill signal).

System policies (lines 6 et seq. in the above illustrative configuration file) affect the entire target application and not just individual threads. Illustratively, JAS has system policies regarding any of the following nine events:

target application has called System.exit(n), where n is different from a user-supplied parameter, indicating an error from which the target cannot recover; this event also triggers a virtual machine shutdown;

virtual machine shutdown, either because the application has terminated or the virtual machine has encountered a fatal internal error;

JAS has encountered a fatal internal error that it cannot recover from;

target application has not terminated within the expected time (process hang);

entire number of running threads in the application has exceeded soft limit;

entire number of running threads in the application has exceeded hard limit;

garbage collection activity took longer than specified;

time between two subsequent garbage collector runs is below minimum time threshold;

an exception object (an object of class java.lang.Throwable or one of its subclasses) was allocated, or an exception handler called a method on an exception object (i.e., an exception was caught by the application); the user may specify a different policy for each exception class.

Lastly, the system specification section in the configuration file contains system-wide parameters. The maxRestarts entry limits the number of application restarts following a restartApp or restartIdleApp action. The checkInterval is the time span between subsequent checks for thread hangs and a process hang. If the parameter monitorAllExceptions is set to yes, JAS reports and logs all exceptions, whether they are handled by the application or not, and regardless of the exception class. This is helpful when trying to determine which exceptions coincide with target failures and how to set up JAS policies accordingly.

The threadStarvationDetection entry in the configuration file directs JAS to turn thread starvation detection on or off. When the user specifies the thread starvation detection process to be "on," the user also specifies time interval checks of a thread starvation condition and how to resolve such a situation (the action). The entry also determines how strict JAS should be in declaring a thread starvation situation (minsensitivity, medSensitiviy, or maxSensitivity). The intuitive meaning of these three levels of strictness is that JAS declares a thread starvation situation if some thread almost never (minSensitivity), rarely (medSensitivity), and not often enough (maxSensitivity), respectively, gains control of the CPU.

Figure 5:
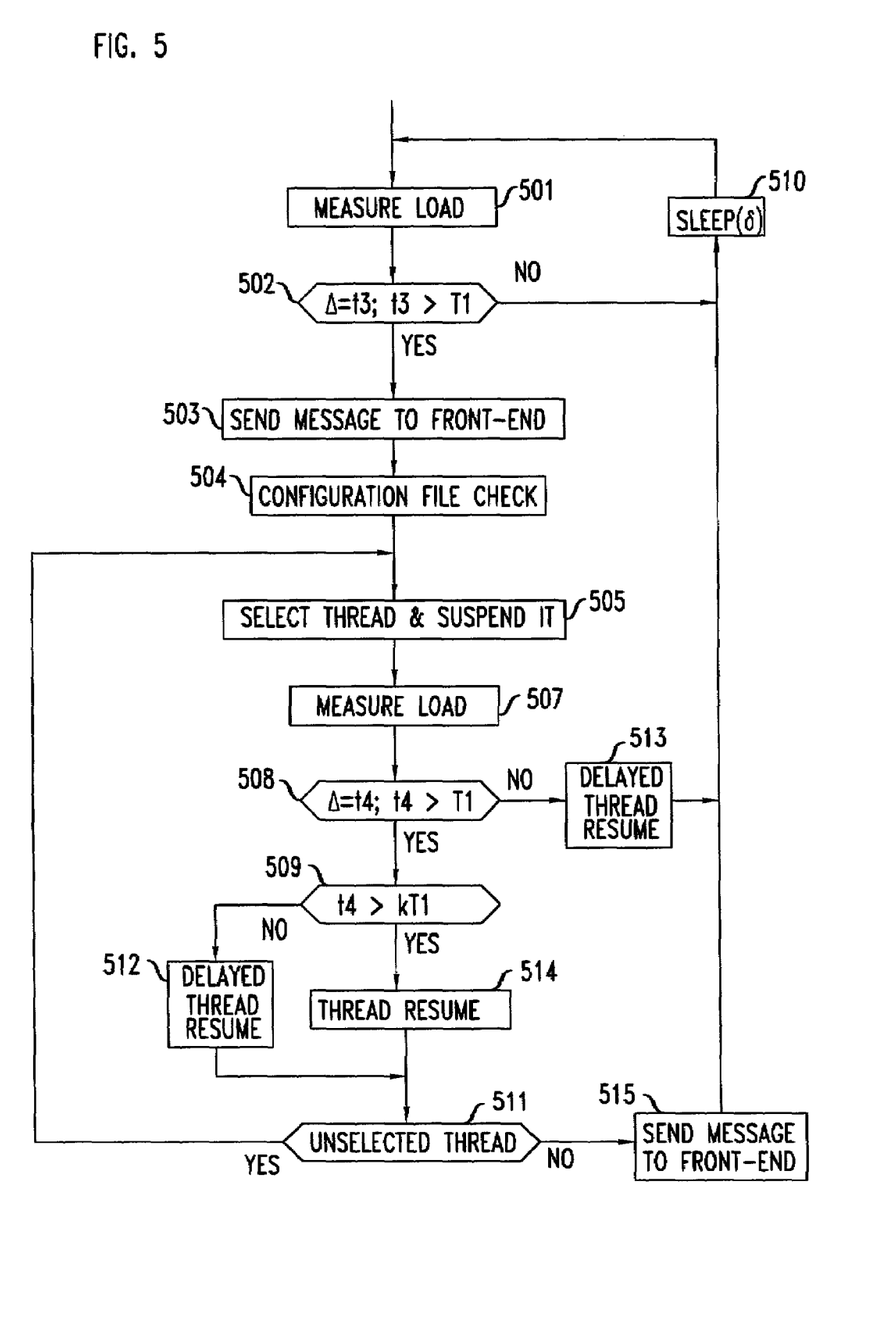
FIG. 5 shows a flowchart of a process for detecting a thread starvation condition.

Thread starvation detection is carried out as part of a JAS-generated check thread as shown, for example, in FIG. 5. Block 501 indirectly measures the CPU load through a four-step subprocess. In step one, variable t1 is set to CPU time, t. In step two, the CPU is effectively relinquished by executing a sleep(0) function. When the CPU returns, in step three, variable t2 is set to CPU time, and in step four a difference time Δ=t2−t1 is computed as a measure of the CPU load.

The sleep(0) function of step two specifies no action for 0 seconds, i.e., relinquishing the CPU for only 0 seconds, but the operating system takes this opportunity to provide its resources to the other threads of the target application, aiming to return within a very short amount of time. However, if there is a subset of the threads that hog the CPU, even a good operating system will not be able to return the CPU to the check thread within a desired time interval. Accordingly, Δ provides an indirect measure of the CPU load.

The step that follows step 501, step 502, sets variable t3 to Δ, and compares the value of t3 to a preselected constant T1. T1 is selected to correspond to a value that in the opinion of the JAS designer, represents a thread starvation condition. Accordingly, when t3 is greater than T1, control passes to step 503. Step 503 sends a message to the JAS front-end that a thread starvation condition was encountered, and passes control to step 504. When t3 is not greater than T1, control passes to step 510, which calls sleep(δ). At the expiration of the sleep period, control returns to step 501, to again check whether a thread starvation condition exists.

Step 504 checks with configuration file 250 to determine the action that the configuration file specifies for the thread starvation condition. In FIG. 5 it assumed that the action specifies is suspend/resume threads. In this action, the goal is to suspend one or more of the threads that cause the thread starvation condition. This is achieved by passing control to step 505, which selects a thread of the target application, suspends it, and passes control to step 507, which measures the CPU load, as described above. Control then passes to step 508, which sets variable t4 to Δ, and assesses t4.

If t4 is less than T1, it means that the suspended thread was a major contributor to the tread starvation condition and that suspending it eliminated the condition. Accordingly, control passes to step 513 which arranges to resume the suspended thread only after a significant delay, for example with a resume command that follows a sleep(Γ) call, where Γ is a value that might impose, for example, a 90 second delay. When t4 is not less then T1, control passes to step 509, which compares t4 to a preselected fraction of t3. The notion is that, though the t4 is still greater than T1, if it is nevertheless reduced sufficiently from the value of t3 it might be surmised that the suspended thread is a significant contributor to thread starvation, and that such a thread should remain suspended. Accordingly, step 509 compares t4 to K×t3. If t4 is less than K×t3, control passes to step 512 where, as in step 513, the suspended thread is resumed only after a significant delay. Otherwise, control passes to step 514, where the suspended thread is resumed immediately. Control passes from steps 513 and 514 to step 511, which determines whether there are any threads remaining that have not been suspended in step 505. If there are such threads, control passes to step 505. Otherwise, control passes to step 515, which sends a message to the JAS front-end that the thread starvation condition has been at least temporarily eliminated, and control returns to step 510.

The JASMonitor entry in the system-wide specification section determines whether the user wants the JAS process to be supervised by JASMonitor 230, which, as indicated above, is an external daemon process. This daemon process can restart JAS and the target application if the JAS process terminates abnormally due to internal virtual machine or native code failures or due to an external event (kill signal, machine crash, etc.). To have a JASMonitor supervise the JAS process, the entry specifies the number of a TCP/IP port of JASMonitor 230 that JAS connects to.

The following presents additional detail regarding the running of a target applications. As indicated above when a target application is asked to run, the Java Application Supervisor is activated by shell script 280. In particular, the script first loads a "jar" file containing the modified runtime class implementations (see below) into the virtual machine, thus preventing the virtual machine from loading the standard implementations of these classes from the rt.jar file. The shell script also supplies parameters to JAS and the Java virtual machine. The shell script is also responsible for limiting the number of target restarts to the maximum specified in the JAS configuration file for that target application. To this end, the shell script receives a return value from JAS when the application is restarted, which provides the number of restarts remaining for the application. Once this value has reached zero, the shell script does not restart the application again.

Application wrapper is involved when an application is started. The function of application wrapper 210 is to:
  read and parse the information obtained from configuration files element 250;
  load the target application into the same process via the Java reflection mechanism;
  start the target application by calling its main method;
  start check threads that determines whether threads or the target application are hung, or whether a thread starvation situation has occurred.

Once the application wrapper has finished its job, it leaves the work to the supervisor agent and the modified Java runtime classes.

The supervisor agent is the core of JAS. It is a shared library and attaches to the Java virtual machine through interface 125. The implementation language that was selected for the agent 220 is C++ because the JVMPI, JVMDI, and JNI are C/C++ interfaces and because maximum speed for the supervisor agent is highly desirable if one is to realize a low performance overhead for JAS.

The supervisor agent stores all the policies that the generic application wrapper parsed in a policies hashtable (files 260). It then requests notifications from the JVMPI of elementary events that JAS needs to know about in order to determine whether events described in JAS policies have occurred. The elementary events are:
  thread start (necessary for checking soft and hard limits);
  garbage collection start and end;
  virtual machine startup completed (signaling target execution start);
  virtual machine shutdown.

In addition, without explicit request from agent 220, the modified runtime classes in library 130 communicate to agent 220 the following events:
  thread termination;
  System.exit(n) call;
  exception raised or caught.

The classes of runtime library 130 whose implementations are modified are all part of the java.lang package and these are: Thread, ThreadGroup, Runtime, and Throwable. The implementation changes are not visible to users of those classes and are very minor, essentially consisting of a few new lines of code in certain methods.

When a thread starts, the number of threads at the time of the thread start might exceed a user-specified soft or hard limit for the number of threads. If this is the case and the specified action for this event is thread suspension, the supervisor agent puts the execution of this thread on hold. Whenever a thread termination event occurs, the supervisor agent checks whether the number of active threads has now fallen below the soft or hard limit. If so, the supervisor resumes the execution of the thread that has been suspended for the longest time. JAS uses the JVMPI SuspendThread and ResumeThread calls, respectively, to suspend and resume time execution of threads.

When reading configuration file 250, application wrapper 210 assigns a unique integer identification number (class ID) to each subclass of classes Throwable and Thread that appear in the JAS configuration. The class ID is stored in a "Class ID" hashtable within supervisor 220. Inner classes and classes loaded during program execution receive class IDs as well.

The Throwable class of the FIG. 1 embodiment modifies all non-native methods with a new line of code that informs the supervisor agent of the method's invocation. Specifically, the added line of code indicates to the supervisor agent that the application has thrown or caught an exception and passes the class ID of the exception, as retrieved from the hashtable of class IDs, to the supervisor agent. The modified Thread class implementation makes the class ID a part of the thread name but hides that fact from a Thread class user by only returning the original thread name without the class ID in a Thread.getName method invocation. When the JVMPI notifies the supervisor agent of a thread start, it includes the name of the started thread and thus its class ID. The supervisor uses class IDs as keys into a hashtable that stores thread and exception class policies as defined by the user in the JAS configuration.

The ThreadGroup class of the FIG. 1 embodiment modifies the uncaughtException method to notify the supervisor of an abnormal thread death. The supervisor receives the class ID of the dying thread and a stack trace from the modified uncaughtException method. The supervisor eventually sends a stack trace to the front-end 240 for logging purposes. The ThreadGroup. remove method that the virtual machine calls upon a thread death is also modified, with code that informs the supervisor of a normal thread termination. Both the modified uncaughtException and remove methods receive a return value from the supervisor agent, indicating whether the policy that handles the thread death calls for a thread restart.

Agent 220 executes a restart thread action following the death of a thread of a class T by spawning a thread of a JAS-implemented class StarterThread. The run method of class StarterThread calls the run method of class T and thus re-executes the T thread that just died. The member variables of T retain the values that they had when the T thread terminated. Notice that the Java virtual machine prohibits calling the Thread. start method twice for the same thread object. Therefore, JAS cannot re-execute the T thread by calling T.start. Because it adopts the same class ID as T, the newly spawned StarterThread is subject to the same JAS policies as the T thread. When the StarterThread later encounters a JAS-relevant problem it passes T's class ID to the supervisor agent and thus masquerades as a T thread.

Once supervisor 220 has started, it will connect to an instance of the JASMonitor process running on the same machine. The JASMonitor is a daemon process (a service on Microsoft Windows operating systems) that will restart the JAS process if the latter happens to terminate abnormally, either because of an internal failure in the supervisor, the application's native code, or the virtual machine itself, or because of an external event such as a kill signal or a machine crash. Such events are not handled by the supervisor and require an external process to intervene for the purpose of ensuring the persistence of the JAS process. When the JAS supervisor agent connects to the JASMonitor via a TCP/IP connection, it sends a registration message that includes the location of the shell script that started this instance of the JAS process. The JASMonitor logs the registration message to a file. If the JASMonitor finds a registration message in this file upon startup, it knows that the host machine had crashed previously and that an instance of JAS was running at the time of the crash. The JASMonitor uses the information about the location and name of the JAS shell script in the registration message to restart JAS. If JAS terminates normally, it sends a deregistration message to the JASMonitor which erases the registration message from its log file. If the connection between JAS and the JASMonitor breaks without the latter having received a prior deregistration message, the JASMonitor concludes that the JAS process has terminated abnormally and needs to be restarted (if JAS terminates abnormally, it breaks the TCP/IP connection to the JASMonitor, and TCP/IP will notify the JASMonitor of this).

The Runtime.exit class of the FIG. 1 embodiment delivers a message to supervisor agent 220 that includes the exit code that the target passed to a Runtime. exit or System.exit call (System.exit calls Runtime.exit). Depending on the JAS configuration, JAS then shuts down or restarts the target if the maximum number of restarts has not been reached yet.

The supervisor agent also periodically executes a thread and application check that determines whether any thread, or the entire application, is hung. A check thread with maximum priority that wakes up in user-defined time intervals performs these checks. The supervisor records the start time of each thread and of the application in a thread and application control block, respectively, in supervisor 220. Supervisor agent 220 enters all control blocks into a linear list. The check thread scans the list whenever it wakes up. For each control block, it compares the current time with the thread or application start time, respectively, and determines whether the elapsed time exceeds a configuration-dependent limit for the thread or for the application. Every time the check thread wakes up, it also sends a signal to front-end module 240 (if configuration file 210 so specified), indicating that the target process is still alive. If the front-end does not receive such a signal within a certain time interval, either the communication link to JAS is broken or JAS has silently failed. If the communication link is the problem, JAS attempts to reestablish the connection to the front-end repeatedly until it either succeeds or considers the communication link to have failed permanently.

A JAS action that merits further explanation is restartIdleApp. When the JAS configuration calls for this action in response to an event, JAS sets a Boolean flag that is read by the aforementioned check thread whenever it wakes up. If the Boolean flag is set, the check thread initiated by supervisor agent 220, determines via the JVMPI ThreadHasRun method, for each thread in the target application, whether the thread has consumed CPU time during the time interval between the last run of the check thread and the current one. If none of the target application threads have consumed any CPU time, JAS restarts the application. By adjusting the check thread time intervals in the JAS configuration, the user can determine how long all threads must remain idle before JAS considers the target application idle. In the context of this disclosure, the term checkpointing refers to the storing of the entire state space information of the target application, which allows restarting the target application at the point of checkpointing, and also storing a specified portion of the entire state space of the target application that allows restarting a specified thread, or specified threads, of the target application, or the entire application but only with some of its state space (typically the "important" parts) restored to the point of checkpointing.

Checkpointing is a term often used in connection with the storing in a relatively stable storage medium—normally, a file or database—of the entire state information of an application, to allow the application to be restarted effectively at the point where checkpointing was executed. This typically involves a significant amount of storage and a significant processing load. The latter represents an overhead for the application, for it does not advance the tasks of the application. Stand-alone checkpointing packages exist in the art. They are triggered either by code inserted into the application itself, or pursuant to some algorithm, such as every 5 minutes, when the size of the application exceeds a predetermined threshold, the activity level of the application exceeds a predetermined threshold, or some similar heuristic.

JAS advances the art by coupling checkpointing with the identification of an execution problem in the target application. Further, JAS offers the capability to perform different levels of checkpointing.

First, any of the above approaches to checkpointing can be employed in combination with JAS to restart the application with the checkpointed data when JAS determines that there is an execution problem. This is accomplished simply by modifying the target application's configuration file to specify the conditions under which the action to be taken is a restart with checkpointed data.

Second, it is noted that that JAS is already adapted to perform a partial state capture via the dump partial target state action. It is a simple extension to include a checkpoint action that captures the entire state space of the target application. To activate this capability, as in the above, the configuration file of the target application needs to be modified to replace dump partial target state actions with checkpoint actions, or to replace some of the dump partial target state actions with checkpoint actions. Therefore, there is no need to employ a "stand-alone" checkpointing software package.

An important advantage of the checkpointing method disclosed herein is that its overhead is significantly lower than in prior art approaches because it takes place only when an execution problem occurs, rather than at predetermined intervals.

Third, it is noted that the same recording-of-information capability is available on a thread-by thread basis, as disclosed above in connection with the restart thread action. Actually, it might be recalled that a thread failure or termination leave all of the object-level variables intact, so it is a simple extension to provide for the storage of all information that is needed to checkpoint a thread, rather than a complete application.

A significant additional capability is provided in the FIG. 1 system by allowing the designer/user of the target application to create a limited, and consequently fast, checkpointing. This is accomplished by allowing the designer/user of the target application—who presumably is intimately familiar with the target application—to conclude that not all of the applications' state information needs to be captured at all time. Rather, the designer/user might conclude that various points of the target application's execution, a mere subset of the target application's state information is necessary for checkpointed-restarting of the target application (i.e., a restarting of the target application with the checkpointed information, thereby restarting the application at the point of its execution when the checkpointed information was captured). Thus, the designer/user of the target application might conclude that with the start of execution of one segment of the target application's code, checkpointing subset A will suffice, while starting with the execution of another segment of the target application's code, checkpointing subset B will suffice, etc. Of course, storing the information of subset A and then restarting the target application at state X based on the stored information does not place the target application in exactly the same state it was in at the instant of checkpointing but, presumably, the designer/user has concluded that starting at state X suffices.

To act on these conclusions, regarding which portions of the target application that need to be checkpointed at beginning of the execution of different segments of the target application's code, the designer/user inserts a code fragment at the beginning of each such segment. This code fragment communicates to JAS what is to be kept track of, so that, should execution problem arise and a checkpointing process needs to be carried out, JAS will have the information necessary to identify and capture the information that needs to be stored.

For the JAS embodiment of this disclosure, the designer/user is offered the ability to specify to JAS a set of objects that the designer wishes to checkpoint. More particularly, in recognition of the fact that the objects identified at the beginning of a target application's code segment (whether in being, or expected to be created) will spawn other objects, the specification of an object by the designer/user is treated as a specification of the object and all its descendants; or stated differently, the specification of a tree, where the specified object is the root of the tree.

The specific code fragment that the disclosed JAS embodiment requires for the creation of an object, o, of class C, for object persistence, and to set up a transitive closure of all objects that are directly or indirectly referenced by o for object persistence is effected by:

```
C o = (C) javax.jas.ObjectCheckpointer.retrieveRoot(<"example">);
if(o = = null) {
    o = new C(<arguments>);
    javax.jas.ObjectCheckpointer.registerNewRoot(o, <"example">);
}
```

The "example" string is an identifier that is uniquely assigned to object o and the entire object tree whose root is o.

Basically, this code fragment tells JAS to look for an object tree that is associated with the keyword "example". If JAS cannot find such an object tree, i.e., if JAS had not checkpointed an object tree with keyword "example" before, then JAS is told to create a new object tree root called "o," associate it with the keyword "example," and keep track of the specified object tree.

In operation, while the target application executes, JAS merely keeps track of the trees of the objects specified as described above. When JAS encounters a failure, and it is asked to checkpoint all object trees that were generated in this way, it captures the information of all objected in the trees that are being kept track of and stores the captured information. When the target application restarts, the specified object trees are recreated from the stored information, and the application restarts as intended.

It may be noted that unlike other functionalities of JAS, this particular checkpointing capability requires the aforementioned code fragments to be included in the target application in order to utilize a function of JAS. Of course, the other checkpointing embodiments described above do not require code additions/modifications in the target application, and other object persistence schemes can be employed that also do not require the insertion of code into the target application's code.

In applications where checkpointing is employed and such checkpointing requires modifications to the target application by the user, step 104 in the FIG. 2 flowchart provides the user with the opportunity to insert checkpointing flags in the target applications. When checkpointing flags can be inserted automatically through automated analysis of the target application by the configuration manager, the modification of the target application by the configuration manager takes place in step 103.

The invention claimed is:

1. A method for executing a target application on a computer, comprising the steps of:
   executing program code of said target application;
   receiving a notification of an event specifying an unexpected or erroneous behavior in execution of said program code;
   searching a configuration file that is external to said target application, said configuration file maintains a listing of events and associated actions, at least one of said actions being a restarting of said target application when said target application becomes idle;
   said configuration file specifies periodic checking for a thread starvation condition;
   retrieving an action from said configuration file that is associated with said event; and
   carrying out said action.

2. The method of claim 1 where said configuration file includes a plurality of events and associated actions, where said actions are taken from a set that includes thread restarts.

3. The method of claim 1 where said configuration file includes a plurality of events and associated actions, where said actions are taken from a set that includes a partial state dump.

4. The method of claim 1 where said configuration file includes a plurality of events and associated actions, where said actions are taken from a set that restarting said target application from a checkpointed state.

5. The method of claim 1 where said configuration file includes a plurality of events and associated actions, where said actions are taken from a set that restarting a thread of said target application from a checkpointed state.

6. The method of claim 1 further comprising a step of periodically checking for the thread starvation condition.

7. The method of claim of claim 6 where said checking for a thread starvation condition includes the step of checking whether there is a subset of threads of said target application that take more than a predetermined share of CPU time of said computer.

8. The method of claim 6 where said checking for a thread starvation condition includes the step of checking whether a thread of said target application receives less than a predetermined share of CPU time of said computer.

9. The method of claim 6 where said checking for a thread starvation condition is carried out with a thread that
   records a time t1 for relinquishing CPU time of said computer;
   relinquishes CPU time of said computer for a specified time,
   records a time t2 when it reacquires CPU time of said computer, and
   concludes that the thread starvation condition exists when time t2 is greater than time t1 by a predetermined amount.

10. The method of claim 7 where said configuration file includes a plurality of events and associated actions, where said actions are taken from a set that includes recovery from the thread starvation condition.

11. The method of claim 10 where said recovery from the thread starvation condition comprises suspending one or more threads for a preselected period of time.

12. The method of claim 11 where said suspending one or more threads is carrying out by iteratively selecting a thread, suspending the selected thread, and testing effect of the suspension of the selected thread on said thread starvation condition.

13. The method of claim 11 where said one or more threads that are suspended are threads that eliminate said thread starvation condition, or reduce the thread starvation condition by a predetermined amount.

14. The method of claim 1 further comprising a step checkpointing said target application in accordance with a predetermined algorithm, and said configuration file includes at least one action that restarts said target application based on information obtained via said checkpointing.

15. Themethod of claim 1 further comprising a step checkpointing said target application that is executed at regular intervals, or when the amount of information stored for said target application exceeds a predetermined threshold, or when activity level of said target application exceeds a predetermined threshold.

16. The method of claim 1 where said configuration file includes a plurality of events and associated actions, where said actions are taken from a set that includes a checkpointing and a restart based on information obtained from said checkpointing.

17. The method of claim 16 where said checkpointing is in accordance with information provided by said program code.

18. The method of claim 17 where said program code specifies a thread and all progeny of said thread.

19. The method of claim 1 further comprising a step checkpointing when said notification of said event is received, and said configuration file includes at least one action that restarts said target application based on information obtained via said checkpointing.

20. The method of claim 19 where said checkpointing stores state information in accordance with specification by said target application.

21. A system including a processing unit including a target application executing on said processing unit; and a supervisor software module external to said target application and executing on said processing unit characterized in that:
   execution code of said target application is unaware of said supervisor module; and
   said supervisor module monitors execution of said target application, and in response to an error or unexpected behavior in said execution, takes action that affects said execution, which action is taken from a set of actions that includes an action for terminating execution of said software module and at least an action that restarts said target application only when said target application becomes idle, and determines whether said error exists by checking implicit conditions including at least a thread starvation condition in said execution of said software module.

22. The system of claim 21 where said set includes restarting an execution thread of said application.

23. The system of claim 21 where said set includes storing in a file a partial state of said target application.

24. The system of claim 21 where said set includes storing in a file state information of a thread of said target application.

25. The system of claim 21 where said set includes checkpointing.

26. The system of claim 25 where said checkpointing is triggered by code included in said target application.

27. The system of claim 22 where said set further includes taking no action relative to execution of said software module, but incrementing an error counter and taking one or more of the following actions:
    terminating said application when said error counter reaches a preselected threshold;
    restarting said application immediately when said error counter reaches a preselected threshold;
    restarting said application when it becomes idle when said error counter reaches a preselected threshold;
    terminating an execution thread of said application when said error counter reaches a preselected threshold; and
    restarting an execution thread of said application when said error counter reaches a preselected threshold.

28. The system of claim 21 where said action taken by said supervisor is retrieved from a configuration file that is specific to said target applications, which file specifies actions to be taken in response to specified signal reporting on said error or unexpected behavior.

29. The system of claim 28 where said configuration file is modifiable by a user of said application module.

30. The system of claim 28, further comprising a configuration manager that creates said configuration file by evaluating said code of said application module.

31. The system of claim 21 where said supervisor interacts with a checkpointing module before taking an action from said set that restarts execution of said application module.

32. The system of claim 31 where said checkpointing module that checkpoints execution is independent of said supervisor.

33. The system of claim 32 where said independent module checkpoints pursuant to a predetermined algorithm of said checkpointing module.

34. The system of claim 31 further comprising a configuration file that specifies errors that restart execution of said application with information developed by said checkpointing.

35. The system of claim 31 further comprising a configuration file that specifies errors that restart execution of said application with information developed by said checkpointing and errors that restart execution of said target application without information developed by said checkpointing.

36. The system of claim 21 where said supervisor maintains state information of an execution thread of said target application, which when said execution thread causes said error or unexpected condition, said supervisor restarts said thread using said state information.

37. A system including a processing unit including an application software module executing on said processing unit; and a supervisor software module external to said application software module and executing on said processing unit characterized in that:
    execution code of said application software module makes no reference to said supervisor module except for sending one or more messages to said supervisor, at one or more locations of said code, specifying a subset of state information of said application module for said supervisor module to keep track of for possible checkpointing; and
    said supervisor module monitors execution of said application module, concurrently keeps tract of scope of said subset of state information specified in a most recently received one of said messages, and determines whether said errors exist by checking implicit conditions including at least a thread starvation condition during execution of said code.

38. The system of claim 37 where said supervisor stores checkpointing information, pursuant to said scope of said subset of state information when said supervisor determines that execution of said application module is characterized by abnormal behavior that calls for restarting execution of said application module.

39. The system of claim 38 where, following said storing of checkpointing information, said supervisor restarts execution of said application module.

40. The system of claim 37 where each of said one or more messages specifies said subset of state information by specifying one or more object trees.

* * * * *